United States Patent [19]

Fujiwara

[11] 4,009,055

[45] Feb. 22, 1977

[54] APPARATUS FOR PRODUCING ELECTRICITY IN CASE OF FIRE

[76] Inventor: Akinobu Fujiwara, 3204 Shimohatsukari Hatsukaricho, Otsuki, Yamanashi, Japan

[22] Filed: June 3, 1975

[21] Appl. No.: 583,396

[30] Foreign Application Priority Data

July 15, 1974 Japan .............................. 49-81557

[52] U.S. Cl. ........................... 429/112; 340/227.1; 429/118
[51] Int. Cl.² ...................................... H01M 6/30
[58] Field of Search ............ 136/162, 113, 83, 181, 136/182, 100 M, 90; 204/195 R; 340/227.1

[56] References Cited

UNITED STATES PATENTS

| | | | |
|---|---|---|---|
| 2,289,128 | 7/1942 | Kopf | 136/182 |
| 2,814,662 | 11/1957 | Marsal | 136/113 |
| 2,989,737 | 6/1961 | Collum | 340/227.1 |
| 3,324,464 | 6/1967 | Edwards et al. | 136/162 |
| 3,434,133 | 3/1969 | Collum | 136/162 |

Primary Examiner—Donald L. Walton
Attorney, Agent, or Firm—Wenderoth, Lind & Ponack

[57] ABSTRACT

A method of and an apparatus for producing electricity when a fire breaks out, the apparatus comprising a normally sealed vessel of breakable material having an amount of activation electrolyte therein and a water-activated cell provided close to the vessel and which can produce electricity when it touches the electrolyte, so that if a temperature rise is sensed the vessel is broken from which the electrolyte is burst out and the cell is activated by touching and reacting with the electrolyte.

15 Claims, 4 Drawing Figures

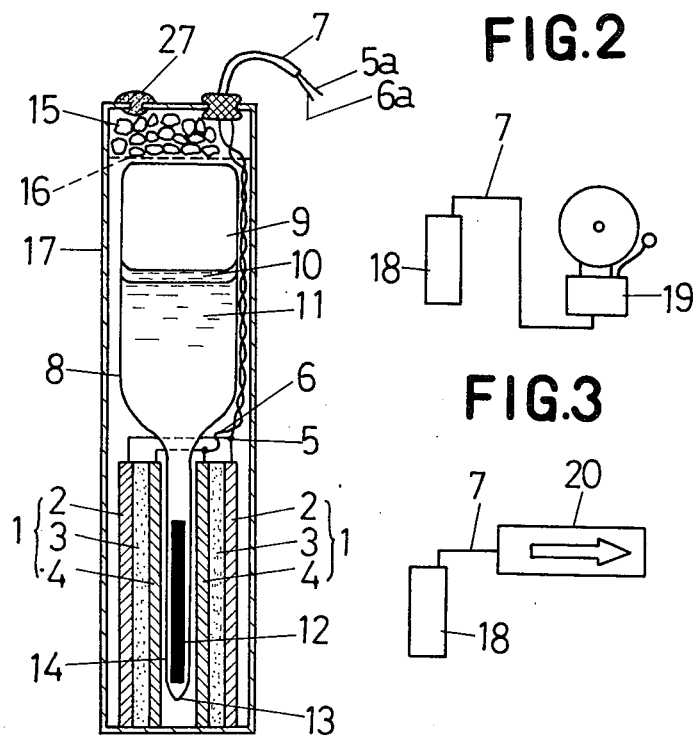
FIG.1
FIG.2
FIG.3
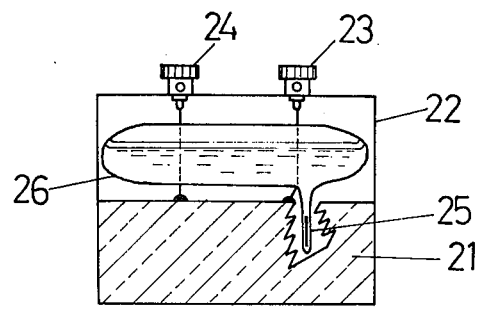
FIG. 4

APPARATUS FOR PRODUCING ELECTRICITY IN CASE OF FIRE

BACKGROUND OF THE INVENTION

This invention relates to a method of and an apparatus for producing an electromotive force as soon as an elevated temperature is sensed as a result of a fire, and more particularly to novel method and apparatus of the character in which the apparatus can be actuated with certainty and without errors even if external electric supply is unexpectedly interrupted at the time of a fire, providing highly reliable safety means on such occasions.

There are hereto known fire alarms or emergency lights which are mostly actuated by external commercial electricity, self-contained dry cells or secondary cells. However, it is very likely that the commercial electricity may be cut off at the time of a fire. Furthermore, it is known that the dry cell or secondary cell will be unreliable with regard to its working life or durability if it is not in service for a long period of time, and therefore needs very careful and costly maintenance and inspection service during that period.

There is also known a single-function fire alarm which is exclusively intended to produce warning sounds. An overall or plural-function fire alarm system is also known, but it cost so high that it is difficult or impossible to install one at home in general.

SUMMARY OF THE INVENTION

It is therefore one object of the present invention to provide a method of and an apparatus for producing an electromotive force as soon as a rise in the ambient temperature is sensed at the time of a fire.

It is another object of the present invention to provide a method of and an apparatus for producing an electric power when a fire breaks out, in which the method and the apparatus can apply to all electrically-actuated devices or systems such as bell-alarms, fire escape lights, emergency lights, smoke exhausters, broadcasting equipment and the like.

More particularly, the apparatus according to the present invention includes self-contained sensor element which can detect a rise in temperature as a result of a fire, and a self-contained power supply source or electric generator which can supply an electric current to external fire alarms, emergency lights and the like for triggering them. In accordance with the invention, therefore, the apparatus can be actuated at the very moment a fire breaks out, so that it can supply an electric current without delay. As easily understood from the above, the apparatus can be actuated without any external power supply, and no periodical maintenance and inspection service such as replacement of cells is necessary until there is actually a rise in temperature as a result of a fire.

In addition, it has a variety of uses or applications as an electric generator, and is of a simple construction which makes it not only troublefree but also highly reliable, and available at a very moderate price.

Other advantages of the invention are that the apparatus can be installed at any desired location and without limitations; that it can be installed with great easiness; that the temperature at which it should be actuated can be selected previously and freely; and that it can be used as an emergency power supply regardless of its location, if provision is made so that its thermo-sensitive element is broken either by heating it forcedly or by hand wherever necessary.

Other objects and advantages of the invention will become apparent from the following specification and accompanying drawings.

BRIEF DESCRIPTION OF DRAWINGS

FIG. 1 is a cross-sectional view of an apparatus embodying the present invention;

FIG. 2 is a block diagram of an example in which the apparatus is used with the bell-alarm;

FIG. 3 is a block diagram of an example in which the apparatus is used with the fire-escape light; and FIG. 4 is a cross-sectional view, partly broken away, of another preferred embodiment of the invention.

DESCRIPTION OF THE PREFERRED EMBODIMENTS

The present invention will further be described by way of several preferred embodiments thereof by reference to the accompanying drawings in which:

Referring first to FIG. 1, a water-activated cell or battery 1, 1 is provided at the lower portion of a housing 17, and comprises an element formed by disposing a porous water-absorbent material 3 such as sponge of continuously-foamed synthetic resin material between anode activated substance 2 in the form of anode plate and cathode activated substance 4 in the form of cathode plate. A conductor wire 5 has one end thereof connected to the anode of the cell 1, 1, and the other end thereof connected to a conductor 5a of a lead-out wire 7. Similarly, a conductor wire 6 has one end thereof connected to the cathode of the cell 1, 1, and has the other end thereof connected to a conductor 6a of the lead-out wire 7.

A vessel 8 of glass material and provided with a glass capillary tube 14 integrally thereof contains an amount of pressure-gas generating material 10 and an amount of cell activating electrolyte 11 therein. A thermo-sensitive element 12 of bendable material is provided inside the glass capillary tube 14. The tube 14 has an opening 13 at the tip thereof, which is closed for sealing the tube 14. The vessel 8 is disposed in the housing 17 so that its capillary tube 14 can be placed as shown in the gap or space left between the cell 1, 1. As shown, a net 16 is provided at the upper portion of the vessel 8, on which an amount of drying material 15 is arranged. Pressure-gas relief safety means 27 is detachably provided as shown, keeping the housing 17 sealed during the normal time.

In accordance with the apparatus constructed as illustrated above, if there is a rise in the ambient temperature as a result of a fire, the pressure-gas generating material 10 start to vaporize, causing the pressure chamber 9 of the vessel 8 to be filled with an increased pressure. In this case, provision may be made so that the vessel 8 can be broken when the internal pressure of the chamber 9 increases. However, this is not preferable since the temperature at which the vessel 8 can be broken must be extremely high. In the above embodiment, therefore, it is so arranged that the vessel 8 cannot be broken only under the increased pressure. If there is an increase in the internal pressure of the vessel 8, the electrolyte 11 is always forced to go down, and the thermo-sensitive element 12 provided inside the tube 14 begins to bend with the rising temperature. When the element 12 is heated up to a given temperature, it breaks the tube 14, bursting the electrolyte 11 under pressure out of the tube 14. The water-activated cell 1 is then emmersed in the electrolyte 11, which activates the cell 1 to produce electricity. The electric power thus obtained is transmitted through the wires 5 and 6 to the external lead-out wire 7.

Drying material 15 such as silica gel for example serves to absorb the moisture inside the housing 17, and protect the cell 1 from the moisture. If the internal pressure of the housing 17 rises to excess when pressure gas is produced, the gas relief safety means 27 such as paraffin detachably provided and normally sealing the housing 17 can be broken away.

FIGS. 2 and 3 indicate block diagrams of examples in which the apparatus is used with other external devices. In FIG. 2, an example is shown in which the apparatus is used as power supply of a bell alarm 19. In this example, the external lead-out wire 7 of the apparatus 18 is connected to the bell alarm 19, triggering the alarm 19 when a fire occurs. Another example is shown in FIG. 3, in which the apparatus 18 is used with a fire escape light 20. In this example, it is connected through the wire 7 to the light 20, and can trigger the light 20 if a fire breaks out.

In the above examples, the apparatus 18 can be installed at any place and without limitations, and can also be connected through the wire 7 with external fire alarms and other devices located anywhere away from the apparatus 18. In those examples, the apparatus 18 is used with a single fire alarm, but it may be used as plural-function power supply with a number of various external devices.

Referring next to FIG. 4, another preferred embodiment of the invention will be described in details: As particularly shown in FIG. 4, a water-activated cell of a large capacity 21 is provided at the bottom of a housing 22. A normally sealed vessel 26 containing an amount of activation electrolyte therein and provided with a thermo-sensitive portion 25 of breakable material integrally thereof is disposed inside the housing 22. As in the earlier embodiment, the portion 25 is inserted in the gap or space left between the cell 21. In the drawing, reference numerals 23 and 24 denote a cathode terminal and an anode terminal, respectively, from which an electric current is supplied to external devices such as fire alarms. In the above embodiment, a large amount of electric power can be supplied by actuating the cell 21. It should be noted that the apparatus can operate as described in the preceding embodiment.

The following data were observed with reference to the embodiments described above:

Note that nickel-titanium alloy (known as trademark Nitinol) is used as thermo-sensitive element of bendable material. It was confirmedly observed that the apparatus can be actuated at the ambient temperature range of 53° to 58° C, and that it can start to produce electricity about 15 to 20 seconds after it is placed in a vessel kept to 60° C. Bimetal elements may also be used as thermo-sensitive element. However, the bimetal element can only respond to the ambient temperature above 80° C, and its actuating temperature range is not definite.

The above date were obtained by using a cell 1 which consists of a copper plate and anode activation material composed of a mixture of silver chloride and pelletized silver pressed on the copper plate, and a plate of cathode activation material or magnesium, and by using 15% solution of sodium chloride as electrolyte 11. It should be noted that other electrolytes such as water, aqueous solution of pottasium hydroxide, aqueous solution of sodium hydroxide and the like may also be used, and the choice of those electrolytes depends on the material of the cell used.

The pressure gas generating material 10 should desirably be composed of materials which are of non-soluble and non-reactive character with regard to the electrolyte 11, and are hard to ignite at the rising temperature. Halogenated hydrocarbons of high vapor pressure such as methylene chloride, chloroform and the like show good results. Other materials, though inflammable, may be used, including ethers such as ethyl ether or hydrocarbons such as pentane, isohexane and the like. A very small amount of any of those materials, namely 0.1 to 0.5 cc, can actuate the apparatus with certainty if a fire occurs, and can prevent the fire from developing into a serious problem or disaster.

Furthermore, other materials which are of reactive character with regard to the electrolyte 11 and can produce pressure gas by reaction with the electrolyte 11 may be used, and include magnesium, zinc, aluminium and the like. Those materials also show good results if a small amount of any of them is added just before sealing the vessel 8.

In accordance with the invention described hereto with reference to the several preferred embodiments, there is provided a thermo-sensitive element of bendable character which can bend with the rising temperature as a result of a fire. Bending of the element causes the capillary tube to collapse, from which the electrolyte can be burst out so that it can activate the cell for producing electricity. Furthermore, provision is made to ensure that the cell element and the electrolyte cannot react with each other during the normal time.

As easily understood from the foregoing specification, the invention provides various advantages such as safety, reliablity, easy maintenance service, and versatility. As also noted, the apparatus according to the invention can be used as power supply of fire alarms, fire escape lights, and other similar devices.

In the above embodiments, a glass capillary tube 14 is shown for example. However, any other means may be used if it is of easily breakable nature. In other words, the objects of the invention can be achieved if it is easily broken as a result of the bending of the thermo-sensitive element.

Although the invention has been illustrated with reference to the several preferred embodiments thereof, it should be understood that various changes and modifications may be made without departing from the scope and spirit of the invention.

What is claimed:

1. An apparatus for producing electricity in case of a fire, comprising a housing, water-activated cell element, and a normally sealed vessel of breakable material containing an amount of activation electrolyte therein and having tubular capillary means of breakable material integrally thereof and disposed close to said cell element, said tubular capillary means having thermo-sensitive element of bendable material therein.

2. An apparatus as claimed in claim 1, wherein said cell element comprises an element of porous water-absorbent material having cathode plate and cathode active substance holding one side of said element of porous water-absorbent material, and having anode plate and anode active substance holding the other side of said element.

3. An apparatus as claimed in claim 2, wherein said anode active substance comprises a mixture of silver chloride and pelletized silver pressed on a plate of copper material, and said cathode active substance comprises a plate of magnesium material.

4. An apparatus as claimed in claim 1, wherein said vessel is made of glass material.

5. An apparatus as claimed in claim 1, wherein said thermo-sensitive element is made of nickel-titanium alloy.

6. An apparatus as claimed in claim 1, wherein said activation electrolyte comprises 15% sodium chloride solution.

7. An apparatus as claimed in claim 1, wherein said activation electrolyte comprises water.

8. An apparatus as claimed in claim 1, wherein said activation electrolyte comprises aqueous solution of potassium hydroxide.

9. An apparatus as claimed in claim 1, wherein said activation electrolyte comprises aqueous solution of sodium hydroxide.

10. An apparatus as claimed in claim 1, wherein said housing has an amount of drying material therein.

11. An apparatus as claimed in claim 1, wherein said housing has excess-gas relief safety means thereon which normally keeps said housing sealed.

12. An apparatus as claimed in claim 1, wherein said vessel has pressure gas producing material therein.

13. An apparatus as claimed in claim 12, wherein said pressure gas producing material comprises halogenated hydrocarbons.

14. An apparatus as claimed in claim 12, wherein said pressure gas producing material comprises ethers.

15. An apparatus as claimed in claim 12, wherein said pressure gas producing material comprises hydrocarbons.

* * * * *